UNITED STATES PATENT OFFICE.

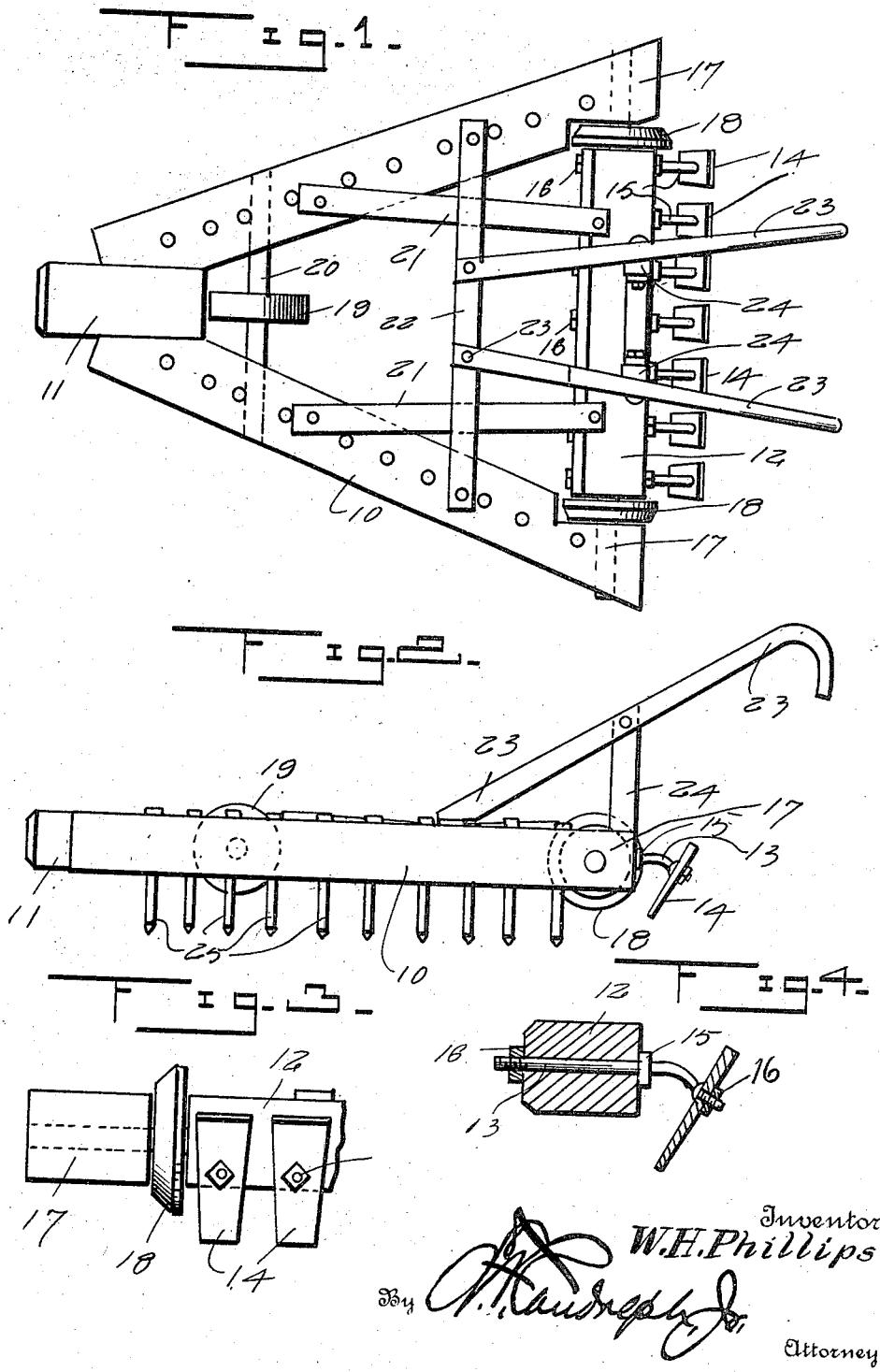

WILLIAM H. PHILLIPS, OF ALBANY, ALABAMA.

CULTIVATOR.

1,300,767. Specification of Letters Patent. Patented Apr. 15, 1919.

Application filed July 5, 1918. Serial No. 243,409.

*To all whom it may concern:*

Be it known that I, WILLIAM H. PHILLIPS, a citizen of the United States, residing at Albany, in the county of Morgan and State of Alabama, have invented certain new and useful Improvements in Cultivators; and I do hereby declare the following to be a full, clear, and exact description of the invention, such as will enable others skilled in the art to which it appertains to make and use the same.

The object of the invention is to provide a simple, inexpensive and efficient cultivator combining the functions of a harrow and a cotton chopper, adapted for general use and capable of manipulation with the minimum of exertion on the part of the operator and at the same time having provision for the replacement as required of worn or injured elements.

Further objects and advantages will appear in the course of the following description, it being understood that changes in form, proportion and details may be resorted to within the scope of the appended claim without departing from the spirit of the invention.

In the drawing:

Figure 1 is a plan view of an apparatus embodying the invention.

Fig. 2 is a side view of the same.

Fig. 3 is a detail rear view of a portion of the machine to show the relative arrangement of the chopper shovels or blades and the supporting rollers.

Fig. 4 is a detail sectional view taken through the rear beam in the plane of one of the chopper blade stems.

Essentially the machine embodies forwardly convergent side beams 10 connected to a tongue support 11 and spanned at their remote rear ends by a transverse beam 12 which carries the stems 13 of the chopper blades or shovels 14, the arrangement of which obviously may be varied, and replacement of which is facilitated by the means of engagement of the stems with the beam and which consists, for example, as shown, of collars or washers 15 and nuts 16 threaded upon the extremities of the stems.

The extremities of the transverse beam are preferably reduced to form spindle portions 17 which are seated in corresponding openings in the rear ends of the side beams and mounted upon these reduced portions are the rear supporting rollers 18 corresponding with a front supporting roller 19 which is mounted upon a transverse spindle 20 connecting the side beams near their forward ends. Braces 21 connect the forward portions of the side beams with intermediate portions of the transverse rear beam, and a transverse brace 22 spans the interval between and is terminally attached to the side beams for anchoring the forward extremities of the handles 23 to intermediate portions of which extend braces 24 rising from said beam 12.

The side beams are designed to carry the harrow teeth 25 which may be of any preferred design to suit the conditions of the ground and the crops to be cultivated, or by removing the chopping blades or shovels 14 the harrow elements consisting of the framework and depending teeth 25 may be used for the preparation of the soil for planting.

It will be understood from the foregoing description that whether made of wood or of metal the framework is relatively light and therefore may be drawn with a minimum of power and may be directed with a comparatively small amount of exertion on the part of the operator grasping the handles 23, whether the harrow feature alone is in use or the same is supplemented by the chopping blades or shovels 14 which also, as will be obvious, may be of any preferred form but which, as illustrated, consist of flat plates which are slightly tapered toward their lower or cutting edges, said blades by reason of the curvature of the stems 13 being inclined or pitched forward toward their lower extremities.

The use in connection with the frame, the harrow teeth and the chopper blades of forward and rear supporting rollers which serve to limit the penetration of the teeth and also the depth of cutting of said blades, also facilitates the manipulation of the apparatus in the field.

Having described the invention, I claim:

As an article of manufacture, a cultivator having a frame consisting of forwardly convergent side beams and a transverse rear beam connecting the extremities of the side beams, harrow teeth carried by the side beams, cotton chopper blades carried by the rear beam and having their stems extending rearwardly therefrom, supporting and depth controlling rollers mounted upon the frame fore and aft thereof, longitudinal braces connecting intermediate portions of the side beams with the intermediate portions of the transverse beam, a transverse brace connecting the intermediate portions of the side beams, and handles supported at their forward ends by said transverse brace and connected at intermediate points with the rear beam.

In testimony whereof I affix my signature in presence of two witnesses.

WILLIAM H. PHILLIPS.

Witnesses:
 R. B. GROVES,
 R. HOWARD LIVELY.

Copies of this patent may be obtained for five cents each, by addressing the "Commissioner of Patents, Washington, D. C."